United States Patent [19]
Rahman et al.

[11] Patent Number: 5,955,570
[45] Date of Patent: Sep. 21, 1999

[54] TRACE METAL ION REDUCTION BY ION EXCHANGE PACK

[75] Inventors: M. Dalil Rahman; Carlo R. Spilletti, both of Flemington; Michelle M. Cook, Somerville, all of N.J.

[73] Assignee: Clariant International Ltd., Switzerland

[21] Appl. No.: 09/108,817

[22] Filed: Jul. 1, 1998

[51] Int. Cl.[6] .................................................. C08F 6/00
[52] U.S. Cl. ........................... 528/482; 528/491; 528/499; 528/502 R; 528/503; 521/25; 521/28; 430/914; 210/681; 210/686; 210/688
[58] Field of Search ..................... 528/482, 491, 528/499, 502 R, 503; 521/25, 28; 430/914; 210/681, 686, 688

[56] References Cited

U.S. PATENT DOCUMENTS

| | | | |
|---|---|---|---|
| 5,073,622 | 12/1991 | Wojtech et al. | 528/486 |
| 5,525,315 | 6/1996 | Burke | 423/24 |
| 5,679,766 | 10/1997 | Zampini | 528/482 |
| 5,702,611 | 12/1997 | Gronbeck et al. | 210/686 |

*Primary Examiner*—Duc Truong
*Attorney, Agent, or Firm*—Andrew F. Sayko, Jr.

[57] ABSTRACT

The present invention provides methods for solutions having a very low level of metal ions, utilizing a specially designed Ion Exchange Pack. A method is also provided for producing photoresist composition having a very low level of metal ions from novolak resins purified in a process using such an Ion Exchange Pack.

11 Claims, 1 Drawing Sheet

TRACE METAL ION REDUCTION BY ION EXCHANGE PACK

BACKGROUND OF THE INVENTION

The present invention relates to a process for reducing the level of metal ions in film forming novolak resins, photoresist compositions, and other raw materials for photoresist compositions such as solvents, additives, dyes, and surfactants. The present invention also relates to a process that utilizes a specially designed filter element, hereinafter referred to as the "Ion Exchange Pack", as shown in FIG. 1 below. The Ion Exchange Pack is loaded with either a cation exchange resin or an anion exchange resin, a mixture of both, or a chelating ion exchange resin. The resulting loaded Ion Exchange Pack is especially efficient for reducing metal ions and other contaminants from products such as novolak resins, photoresist compositions, and other raw materials for photoresist compositions. The metal ions, cations and anions, are removed by an adsorption process utilizing a cation or anion exchange resin, respectively, or a combination of the two, in such an Ion Exchange Pack.

Photoresist compositions are used in microlithography processes for producing electronic components such as computer hard drives, semiconductor chips and integrated circuits. Generally, in these processes, a thin film coating of a photoresist composition is first applied to a substrate material, such as silicon wafers used for making integrated circuits. The coated substrate is then baked to substantially evaporate any solvent in the photoresist composition and to fix the coating onto the substrate. The baked coated surface of the substrate is next subjected to an image-wise exposure to radiation.

This radiation exposure causes a chemical transformation in the exposed areas of the coated surface. Visible light, ultraviolet (UV) light, electron beam and X-ray radiant energy are radiation types commonly used today in microlithographic processes. After this image-wise exposure, the coated substrate is treated with a developer solution to dissolve and remove either the radiation-exposed or the unexposed areas of the coated surface of the substrate.

Metal ion contamination has been a problem for a long time in the fabrication of high density integrated circuits, computer hard drives and computer chips, often leading to increased defects, yield losses, degradation and decreased performance. In plasma processes, metal ions such as sodium and iron, when they are present in a photoresist, can cause contamination especially during plasma stripping. However, these problems can be overcome to a substantial extent during the fabrication process, for example, by utilizing HCl gettering of the contaminants during a high temperature anneal cycle.

As electronic devices have become more sophisticated, these problems have become much more difficult to overcome. When silicon wafers are coated with a liquid positive photoresist and subsequently stripped off, such as with oxygen microwave plasma, the performance and stability of the semiconductor device is often seen to decrease because of the presence of what would be considered very low levels of metal ions. As the plasma stripping process is repeated, more degradation of the device frequently occurs. A primary cause of such problems has been found to be metal ion contamination in the photoresist, particularly sodium and iron ions. Metal ion levels of than 100 ppb (parts per billion in the photoresist have sometimes been found to adversely affect the properties of such electronic devices.

Film forming novolak resins are frequently used a polymeric binder in liquid photoresist formulations. These resins are typically produced by conducting a condensation reaction between formaldehyde and one or more multi-substituted phenols, in the presence of an acid catalyst, such as oxalic acid or maleic anhydride. In producing sophisticated semiconductor devices, it has become increasingly important to provide novolak resins having metal ion contamination levels below 50 ppb each.

There are two types of photoresist compositions, negative-working and positive-working. When negative-working photoresist compositions are exposed image-wise to radiation, the areas of the resist composition exposed to the radiation become less soluble to a developer solution (e.g. a cross-linking reaction occurs) while the unexposed areas of the photoresist coating remain relatively soluble to such a solution. Thus, treatment of an exposed negative-working resist with a developer causes removal of the non-exposed areas of the photoresist coating and the creation of a negative image in the coating. Thereby uncovering a desired portion of the underlying substrate surface on which the photo-resist composition was deposited. On the other hand, when positive-working photoresist compositions are exposed image-wise to radiation, those areas of the photoresist composition exposed to the radiation become more soluble to the developer solution (e.g. a rearrangement reaction occurs) while those areas not exposed remain relatively insoluble to the developer solution. Thus, treatment of an exposed positive-working photoresist with the developer causes removal of the exposed areas of the coating and the creation of a positive image in the photoresist coating. Again, a desired portion of the underlying substrate surface is uncovered.

After this development operation, the now partially unprotected substrate may be treated with a substrate-etchant solution or plasma gases and the like. The etchant solution or plasma gases etch that portion of the substrate where the photoresist coating was removed during development. The areas of the substrate where the photoresist coating still remains are protected and, thus, an etched pattern is created in the substrate material which corresponds to the photomask used for the image-wise exposure of the radiation. Later, the remaining areas of the photoresist coating may be removed during a stripping operation, leaving a clean etched substrate surface. In some instances, it is desirable to heat treat the remaining photoresist layer, after the development step and before the etching step, to increase its adhesion to the underlying substrate and its resistance to etching solutions.

Positive working photoresist compositions are currently favored over negative working resists because the former generally have better resolution capabilities and pattern transfer characteristics. Photoresist resolution is defined as the smallest feature which the resist composition can transfer from the photomask to the substrate with a high degree of image edge acuity after exposure and development. In many manufacturing applications today, resist resolution on the order of less than one micron are necessary. In addition, it is almost always desirable that the developed photoresist wall profiles be near vertical relative to the substrate. Such demarcations between developed and undeveloped areas of the resist coating translate into accurate pattern transfer of the mask image onto the substrate.

SUMMARY OF THE INVENTION

The present invention relates to a process for removing metal ions from solutions of: film forming novolak resins, photoresist compositions, and other raw materials for photoresist compositions such as solvents, additives, dyes, and surfactants. The present invention also relates to a process for removing metal ions from such solutions, which process utilizes a specially designed Ion Exchange Pack, as shown in the FIG. 1 below. The Ion Exchange Pack will, preferably, also have a filter unit, as shown in FIG. 1, so that solutions can be purified by also removing solid particles.

The present invention relates to a process for producing high purity novolak resins, photoresist compositions, and other raw materials for photoresist compositions such as solvents, additives, dyes, and surfactant containing very low levels of metal ions, i.e. less than 50 ppb each, preferably less than about 35 ppb, more preferably less than about 20 ppb, even more preferably less than about 10 ppb and most preferably less than about 5 ppb each.

The process of the subject invention produces a novolak resin, that is preferably a film forming novolak resin obtained by condensing formaldehyde with one or more phenolic compounds, such as meta-cresol, para-cresol, 3,5-dimethylphenol or 3,5-xylenol. The condensation reaction is preferably carried out in the presence of an acid catalyst, such as oxalic acid or maleic anhydride. The novolak resins obtained have a very low levels of metal ions such as iron, sodium, potassium, calcium, magnesium, copper and zinc, i.e. less than 50 ppb each. Sodium and iron are the most common metal ion contaminants and among the easiest to detect. The level of these metal ions serves as an indicator of the level of other metal ions.

U.S. Pat. No. 5,073,622 discloses a process for producing novolak resins having a total sodium and iron ion level of less than 500 ppb by dissolving the novolak resin in an organic solvent and contacting the solution with aqueous solutions of an acidic complex forming compound.

BRIEF DESCRIPTION OF THE DRAWING

FIG. 1 shows an Ion Exchange Pack unit, which is adapted to receive an influent stream through an inlet 1. The Ion Exchange Pack contains cylindrical bags, 2 and 3, preferably made of high-density polyethylene sheet. The cylindrical bags may have a capacity of from about 1 Kg to about 100 Kg, preferably from about 3 to 50 Kg. The inlet 1 is used for feeding ion exchange resin into the Ion Exchange Pack, such as by using by a funnel. The Ion Exchange Pack has one outlet 4, filter 5 at the bottom, and a supporting tube 6. The whole Ion Exchange Pack is sealed, such as by using a high-density polyethylene plate 7 at the top of the assembly. The entire Ion Exchange Pack is placed inside a housing 8, preferably made from stainless steel. The liquid (solution) to be treated is introduced through the inlet 1 to contact the ion exchange resin beads in the Ion Exchange Pack and exits through the filter 5 at the bottom of the outlet 4 to a receiver vessel. A pump may be used to control the flow rate.

DETAILED DESCRIPTION OF THE PREFERRED EMBODIMENT

Figure 1:
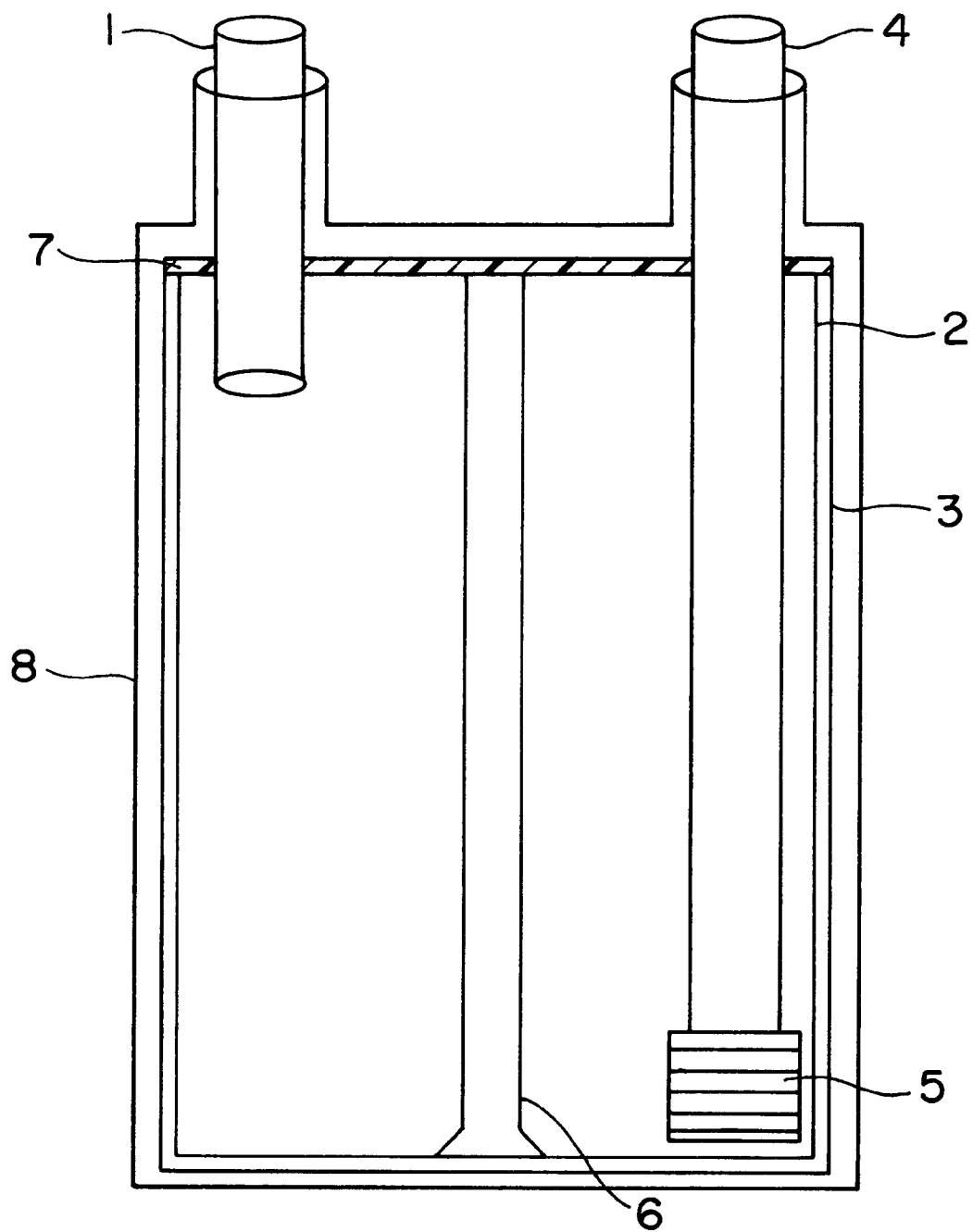
FIG. 1 is a partial cross-sectional view of the preferred embodiment of the Ion Exchange Pack utilized in the process of the present invention. The pack can be made from high-density polyethylene, Teflon® PTFE or any other metal ion-free polymeric material, which is compatible with organic solvents, preferably Teflon® PTFE, or most preferably high-density polyethylene.

The present invention relates to a process for reducing metal ions in film forming novolak resins, photoresist compositions, and other raw materials for photoresist compositions such as solvents, additives, dyes, and surfactant.

The present invention also relates to a specially design filter element, an Ion Exchange Pack, as shown in the FIG. 1. The Ion Exchange Pack is loaded with a cation exchange resin, an anion exchange resin, a mixture of both, or a chelating ion exchange resin. The Ion Exchange Pack will preferably also have a filter so that solid particles can also be removed from solutions. The dissolved metal ions, cations and anions are removed by an adsorption process by an ion exchange resin, or mixture of ion exchange resins, in the Ion Exchange Pack. It may contain a cation exchange resin, such as Amberlyst® 15 resin, for exchanging cations from a liquid; an anion exchange resin, such as Amberlyst® 21 resin, to exchange anions; a mixture of such a cation exchange resin and such an anion exchange resin or it may contain a chelating ion exchange resin, such as IRC®-718 resin. An Ion Exchange Pack unit may include a storage vessel (housing) within which the solution is to be ion exchanged, means for transferring the liquid to the Ion Exchange Pack (such as a funnel), optional means for controlling the flow rate of the liquid through the Ion Exchange Pack, such as a pump, and an outlet through which the purified solution can be transferred into a receiver vessel. It should be noted that the Ion Exchange Pack disclosed herein can be used alone or may also be used in combination with a number of other ion exchangers or ion exchange processes.

The Ion Exchange Pack may be made from any material that is metal ion-free and does not detrimentally interact with the solution to be ion exchanged. The present invention provides a method for purifying solutions, which process comprises:

a) providing a specially designed Ion Exchange Pack, as shown in FIG. 1, which Ion Exchange Pack comprises: 1) a housing, preferably made from a non-corroding substance such as stainless steel, 2) one or more cylindrical bags positioned within such housing, when a plurality of bags is utilized one will be positioned within the other, such bags preferably having a capacity of from about 1 Kg to about 100 Kg, 3) a seal near the top of the housing that is effective to seal the Ion Exchange Pack; 4) an inlet positioned so as to allow the introduction of a solution through the seal into the cylindrical bag(s) positioned within the housing, 5) a support, preferably a supporting tube, that extends from the bottom of the housing to the seal positioned near the top of the housing, and 6) an outlet, preferably an outlet tube, positioned so as to allow the exit of the solution from the Ion Exchange Pack through the seal, the outlet preferably having a filter that is effective in removing solid particles from the solution;

b)
1) rinsing a cation exchange resin, e.g. in a column or in a batch process, with deionized ("DI") water, followed by rinsing with a mineral acid solution (e.g. a 5–98% solution of sulfuric, hydrochloric acid), again rinsing with DI water, and thereby reducing the level of sodium and iron ions in the ion exchange resin to less than 50 ppb each, preferably less than 35 ppb, more preferably less than 20 ppb and most preferably no more than 10 ppb each; or
2) rinsing a chelating ion exchange resin, e.g. in a column or in a batch process, with DI water, followed by rinsing with a mineral acid solution (e.g. a 5–98% solution of sulfuric, nitric or hydrochloric acid), again rinsing with DI water, followed by rinsing with an ammonium hydroxide solution (2–28%), and thereby converting the chelating ion exchange resin to its ammonium salt, followed by again rinsing with DI water, and thereby reducing the level of sodium and iron ions in the chelating ion exchange resin to less than 50 ppb each, preferably less than about 35 ppb, more preferably less than about 20 ppb and most preferably no more than about 10 ppb each; or 3) rinsing an anion exchange resin, e.g. in a column or in a batch process, with an ammonium hydroxide solution (2–28%), followed by rinsing with DI water, and thereby reducing the level of sodium and iron ions in the anion exchange resin to less than 50 ppb each, preferably less than about 35 ppb, more preferably less than about 20 ppb and most preferably no more than about 10 ppb each; or 4) rinsing a mixture of a cation exchange resin and an anion exchange resin with DI water, followed by rinsing with a water soluble organic polar solvent, such as acetone or a C1–C4 alkyl alcohol, and thereby reducing the level of sodium and iron ions to less than 50 ppb each, preferably less than 35 ppb, more preferably less than 20 ppb and most preferably less than 10 ppb each;

c) transferring an ion exchange resin or mixture of ion exchange resins from step b) to the Ion Exchange Pack from step a);

d) either before or after transferring the ion exchange resin(s) from step b) to the Ion Exchange Pack from step a), rinsing the ion exchange resin(s) from step b) with an electronic grade polar solvent, such as acetone or a C1–C4 alkyl alcohol, followed by rinsing with a suitable photoresist solvent, such as propylene glycol methyl ether acetate ("PGMEA"), ethyl lactate or 2-heptanone, to substantially remove the polar solvent;

e) passing a solution, preferably a solution of novolak resin in a suitable solvent such as PGMEA or ethyl lactate, through the Ion Exchange Pack from step d), at a temperature of from about 30 to about 150° C., preferably from about 50 to about 120° C., more preferably from about 60 to about 100° C., most preferably from about 70 to about 90° C., at a flow rate such that the residence time in the Ion Exchange Pack is from about 2 minutes to about 40 hours, preferably from about 30 minutes to about 35 hours, more preferably from about 2 hours to about 30 hours, even more preferably from about 5 hours to about 20 hours and most preferably from about 8 to about 15 hours, and thereby reducing the level of sodium and iron ions in the solution of the material treated to less than 50 ppb each, preferably less than about 35 ppb, more preferably less than about 20 ppb, even more preferably less than about 10 ppb, and most preferably less than about 5 ppb each.

The present invention further provides a process for producing a positive photoresist composition having a very low level of metal ions. The subject process comprises:

a) providing a specially designed Ion Exchange Pack, as shown in FIG. 1, which Ion Exchange Pack comprises: 1) a housing, preferably made from a non-corroding substance such as stainless steel, 2) one or more cylindrical bags positioned within such housing, when a plurality of bags is utilized one will be positioned within the other, such bags preferably having a capacity of from about 1 Kg to about 100 Kg, 3) a seal near the top of the housing that is effective to seal the Ion Exchange Pack; 4) an inlet positioned so as to allow the introduction of a solution through the seal into the cylindrical bag(s) positioned within the housing, 5) a support, preferably a supporting tube, that extends from the bottom of the housing to the seal positioned near the top of the housing, and 6) an outlet, preferably an outlet tube, positioned so as to allow the exit of the solution from the Ion Exchange Pack through the seal, the outlet preferably having a filter that is effective in removing solid particles from the solution;

b)
1) rinsing a cation exchange resin, e.g. in a column or in a batch process, with deionized ("DI") water, followed by rinsing with a mineral acid solution (e.g. a 5–98% solution of sulfuric, hydrochloric acid), again rinsing with DI water, and thereby reducing the level of sodium and iron ions in the ion exchange resin to less than 50 ppb each, preferably less than 35 ppb, more preferably less than 20 ppb and most preferably no more than 10 ppb each; or 2) rinsing a chelating ion exchange resin, e.g. in a column or in a batch process, with DI water, followed by rinsing with a mineral acid solution (e.g. a 5–98% solution of sulfuric, nitric or hydrochloric acid), again rinsing with DI water, followed by rinsing with an ammonium hydroxide solution (2–28%), and thereby converting the chelating ion exchange resin to its ammonium salt, followed by again rinsing with DI water, and thereby reducing the level of sodium and iron ions in the chelating ion exchange resin to less than 50 ppb each, preferably less than about 35 ppb, more preferably less than about 20 ppb and most preferably no more than about 10 ppb each; or 3) rinsing an anion exchange resin, e.g. in a column or in a batch process, with an ammonium hydroxide solution (2–28%), followed by rinsing with DI water, and thereby reducing the level of sodium and iron ions in the anion exchange resin to less than 50 ppb each, preferably less than about 35 ppb, more preferably less than about 20 ppb and most preferably no more than about 10 ppb each; or 4) rinsing a mixture of a cation exchange resin and an anion exchange resin with DI water, followed by rinsing with a water soluble organic polar solvent, such as acetone or a C1–C4 alkyl alcohol, and thereby reducing the level of sodium and iron ions to less than 50 ppb each, preferably less than 35 ppb, more preferably less than 20 ppb and most preferably less than 10 ppb each;

c) transferring an ion exchange resin or mixture of ion exchange resins from step b) to the Ion Exchange Pack from step a);

d) either before or after transferring the ion exchange resin(s) from step b) to the Ion Exchange Pack from step a), rinsing the ion exchange resin(s) from step b) with an electronic grade polar solvent, such as acetone or a C1–C4 alkyl alcohol, followed by rinsing with a suitable photoresist solvent, such as propylene glycol methyl ether acetate ("PGMEA"), ethyl lactate or 2-heptanone, to substantially remove the polar solvent;

e) passing a solution, preferably a solution of novolak resin in a suitable solvent, such as PGMEA or ethyl lactate, through the Ion Exchange Pack from step d), at a temperature of from about 30 to about 150° C., preferably from about 50 to about 120° C., more preferably from about 60 to about 100° C., most preferably from about 70 to about 90° C., at a flow rate such that the residence time in the Ion Exchange Pack is from about 2 minutes to about 40 hours, preferably from about 30 minutes to about 35 hours, more preferably from about 2 hours to about 30 hours, even more preferably from about 5 hours to about 20 hours and most preferably from about 8 to about 15 hours, and thereby reducing the level of sodium and iron ions in the solution of the material treated to less than 50 ppb each, preferably less than about 35 ppb, more preferably less than about 20 ppb, even more preferably less than about 10 ppb, and most preferably less than about 5 ppb each;

f) providing an admixture of: 1) a photosensitive component in an amount sufficient to photosensitize the photoresist composition; 2) the novolak resin solution from step e) and 3) a suitable photoresist solvent.

The novolak resin solvent and the solvent used for washing the ion exchange resin(s) may be identical, and they may both be identical to the photoresist solvent.

A chelating ion exchange resin, such as a styrene/divinylbenzene chelating ion exchange resin, may be utilized in the present process. Such ion exchange resins are available as the sodium form from Rohm and Haas Company, e.g. AMBERLITE® IRC 718, or Chelex® 20 or Chelex® 100 available as the sodium form from Bio Rad Co. Before being utilized in the process of the present invention, the ion exchange resin to be utilized must be rinsed with deionized (DI) water, rinsed with a mineral acid solution such as a 10 percent sulfuric acid solution, rinsed with DI water again, rinsed with an ammonium hydroxide solution and then rinsed again with DI water. When purifying novolak resin solution, it is critical that the ion exchange resin is then rinsed with a solvent that is compatible with the novolak resin solvent.

The novolak resin is passed through the Ion Exchange Pack containing the ammonium form or the acid form of the chelating ion exchange resin as a hot solution, e.g., a solution of about 40 percent novolak resin in a suitable solvent such as ethyl lactate or propylene glycol methyl ether acetate (PGMEA). Such novolak resin solutions typically contain from about 250 to about 1000 ppb each of sodium and iron ions. During the process of the present invention, these levels are each reduced to as low as less than 5 ppb each.

The present invention provides a process for producing a photoresist composition and a process for producing semiconductor devices using such a photoresist composition. The photoresist composition may be formed by providing an admixture of a photosensitizer, a film forming novolak resin purified according to the process of the present invention, and a suitable photoresist solvent. Suitable solvents for such photoresists and for novolak resins may include propylene glycol mono-alkyl ether, propylene glycol alkyl (e.g. methyl) ether acetate, ethyl-3-ethoxypropionate, ethyl lactate, mixtures of ethyl-3-ethoxypropionate and ethyl lactate, 2-heptanone, butyl acetate, xylene, diglyme, ethylene glycol monoethyl ether acetate. The preferred solvents are propylene glycol methyl ether acetate (PGMEA), ethyl lactate, 2-heptanone and ethyl-3-ethoxypropionate (EEP).

Other optional ingredients such as colorants, dyes, anti-striation agents, leveling agents, plasticizers, adhesion promoters, speed enhancers, solvents and such surfactants as non-ionic surfactants may be added to the solution of novolak resin, sensitizer and solvent before the photoresist composition is coated onto a substrate. Examples of dye additives that may be used together with the photoresist compositions of the present invention include Methyl Violet 2B (C.I. No. 42535), Crystal Violet (C.I. 42555). Malachite Green (C.I. No. 42000), Victoria Blue B (C.I. No. 44045) and Neutral Red (C.I. No. 50040) at one to ten percent weight levels, based on the combined weight of novolak and sensitizer. The dye additives help provide increased resolution by inhibiting back scattering of light off the substrate.

Anti-striation agents may be used at up to about a five percent weight level, based on the combined weight of novolak and sensitizer. Plasticizers which may be used include, for example, phosphoric acid tri-(beta-chloroethyl)-ester; stearic acid; dicamphor; polypropylene; acetal resins; phenoxy resins; and alkyl resins, at about one to ten percent weight levels, based on the combined weight of novolak and sensitizer. The plasticizer additives improve the coating properties of the material and enable the application of a film that is smooth and of uniform thickness to the substrate.

Adhesion promoters which may be used include, for example, beta-(3,4-epoxy-cyclohexyl)-ethyltrimethoxysilane; p-methyl-disilane-methylmethacrylate; vinyltrichlorosilane; and gamma-amino-propyl triethoxysilane, up to about a 4 percent weight level, based on the combined weight of novolak and sensitizer. Development speed enhancers that may be used include, for example, picric acid, nicotinic acid or nitrocinnamic acid up to about a 20 percent weight level, based on the combined weight of novolak and sensitizer. These speed enhancers tend to increase the solubility of the photoresist coating in both the exposed and unexposed areas, and thus they are used in applications when speed of development is the overriding consideration, even though some degree of contrast may be sacrificed. In these instances, while the exposed areas of the photoresist coating will be dissolved more quickly by the developer, the speed enhancers will also cause a larger loss of photoresist coating from the unexposed areas.

The photoresist solvent may be present in the overall photoresist composition in an amount of up to 95% by weight of the solids in the photoresist composition. Solvents, of course, are substantially removed after coating of the photoresist solution on a substrate and subsequent drying. Non-ionic surfactants that may be used include, for example, nonylphenoxy poly(ethyleneoxy) ethanol; octylphenoxy ethanol at up to about 10% weight levels, based on the combined weight of novolak and sensitizer.

The prepared photoresist solution can be applied to a substrate by any conventional method used in the photoresist art, including dipping, spraying, whirling and spin coating. When spin coating, for example, the resist solution can be adjusted with respect to the percentage of solids content, in order to provide coating of the desired thickness, given the type of spinning equipment utilized and the amount of time allowed for the spinning process. Suitable substrates include silicon, aluminum, polymeric resins, silicon dioxide, doped silicon dioxide, silicon nitride, tantalum, copper, polysilicon, ceramics, aluminum/copper mixtures; gallium arsenide and other such Group III/V compounds.

The photoresist coatings produced by the described procedure are particularly suitable for application to thermally grown silicon/silicon dioxide-coated wafers, such as are utilized in the production of microprocessors and other miniaturized integrated circuit components. An aluminum/aluminum oxide wafer can also be used. The substrate may also comprise various polymeric resins, especially transparent polymers such as polyesters. The substrate may have an adhesion promoted layer of a suitable composition, such as one containing hexa-alkyl disilazane.

The photoresist composition solution is then coated onto the substrate, and the substrate is treated at a temperature from about 70° C. to about 110° C. for from about 30 seconds to about 180 seconds on a hot plate or for from about 15 to about 90 minutes in a convection oven. This temperature treatment is selected in order to reduce the concentration of residual solvents in the photoresist, while not causing substantial thermal degradation of the photosensitizer. In general, one desires to minimize the concentration of solvents and this first temperature treatment is conducted until substantially all of the solvents have evaporated and a thin coating of photoresist composition, on the order of one micron in thickness, remains on the substrate. In a preferred embodiment the temperature is from about 85° C. to about 95° C. The treatment is conducted until the rate of change of solvent removal becomes relatively insignificant. The temperature and time selection depends on the photoresist properties desired by the user, as well as the equipment used and commercially desired coating times. The coating substrate can then be exposed to actinic radiation, e.g., ultraviolet radiation, at a wavelength of from about 300 nm to about 450 nm, x-ray, electron beam, ion beam or laser radiation, in any desired pattern, produced by use of suitable masks, negatives, stencils, templates, etc.

The photoresist is then optionally subjected to a post exposure second baking or heat treatment either before or after development. The heating temperatures may range from about 90° C. to about 120° C., more preferably from about 100° C. to about 110° C. The heating may be conducted for from about 30 seconds to about 2 minutes, more preferably from about 60 seconds to about 90 seconds on a hot plate or about 30 to about 45 minutes by convection oven.

The exposed photoresist-coated substrates are developed to remove the image-wise exposed areas by immersion in an alkaline developing solution or developed by spray development process. The solution is preferably agitated, for example, by nitrogen burst agitation. The substrates are allowed to remain in the developer until all, or substantially all, of the photoresist coating has dissolved from the exposed areas. Developers may include aqueous solutions of ammonium or alkali metal hydroxides. One preferred hydroxide is tetramethyl ammonium hydroxide. After removal of the coated wafers from the developing solution, one may conduct an optional post-development heat treatment or bake to increase the coating's adhesion and chemical resistance to etching solutions and other substances. The post-development heat treatment can comprise the oven baking of the coating and substrate below the coating's softening point. In industrial applications, particularly in the manufacture of microcircuitry units on silicon/silicon dioxide-type substrates, the developed substrates may be treated with a buffered, hydrofluoric acid base etching solution. The photoresist compositions of the present invention are resistant to acid-base etching solutions and provide effective protection for the unexposed photoresist-coating areas of the substrate.

The following specific examples will provide detailed illustrations of the methods of producing and utilizing compositions of the present invention. Unless otherwise specified, all parts and percentages are by weight and all molecular weights are weight average molecular weight. These examples are not intended, however, to limit or restrict the scope of the invention in any way and should not be construed as providing conditions, parameters or values which must be utilized exclusively in order to practice the present invention.

EXAMPLE 1

300 grams of phenolic compounds consisting of 130.3 grams of m-cresol, 104.25 grams of p-cresol, and 65.5 grams of 2,3,5-trimethyl phenol were transferred to a four necked flask equipped with a condenser, a thermometer, and a dropping funnel. 0.9 gram of oxalic acid was added and the flask was heated to 95° C. 148.4 grams of formaldehyde (molar ratio of phenols/formaldehyde 1/0.69) was added dropwise over one hour. The reaction was allowed to continue for 6 hours at 95° C. The reaction mixture was then distilled, initially at atmospheric pressure and then vacuum was applied to reach a final temperature 200° C. and a pressure of 30 mm Hg. The molten resin was collected in a tray, and 260 grams of solid novolak resin having an RMW of 8.8 was obtained.

200 grams of the solid novolak resin was dissolved in 633 grams of methanol to make 24% (by weight) solution. 231.7 grams of deionized (DI) water (27.8%, by weight, of the batch) was added with stirring over a period of ten minutes. Stirring was stopped and a white precipitate settled to the bottom of the flask. The liquid layer on top was sucked out and discarded. The white precipitate was redissolved in 316.6 grams of methanol, and 115.8 grams of DI water was added with stirring. Stirring was stopped and a white precipitate settled to the bottom of the flask. The liquid layer on top was removed and discarded, and the white precipitate was dissolved in ethyl lactate. The residual methanol and water were removed by vacuum distillation at 75° C. and 20 mm Hg pressure. GPC molecular weight and PD (polydispersity=MWw/MW$_n$, where MW$_w$ is molecular weight based on weight average and Mw$_n$ is molecular weight based on number average) were measured and the results are shown in Table 1 below:

TABLE 1

| Fractions | GPC MW | PD |
|---|---|---|
| Parent Resin | 2992 | 3.6 |
| First Precipitation | 4400 | 4.0 |
| Second Precipitation | 4876 | 3.7 |
| Low MW Fraction Discarded | 955 | 1.7 |

EXAMPLE 2

Procedure

1. A CTG Klean® Ion Exchange Pack, as shown in FIG. 1, containing a solid polypropylene tube and a 1½ inch long 10-μm polypropylene filter cartridge, was filled with 547 grams of a mixed bed of anion exchange resin and cation exchange resin beads from Barnstead® cartridge D8911-X001. The Pack was set up in a filtering system for constant recirculation.

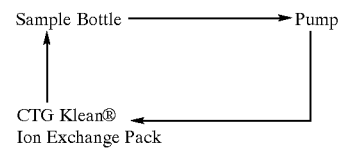

Prior to passing the photoresist sample (AZ® 7908 Photoresist available from A Z Photoresists, Clariant Corp.) through the Pack, the ion exchange resin beads were flushed with methanol by recirculating methanol through the Pack at a flow rate of 126 ml/min. for 15 min. to substantially remove water from the beads. Then an 85/15 ethyl lactate/n-butyl acetate solution was pumped through the ion exchange resin beads at a flow rate of 126 ml/min. for 15 min. to remove methanol from the beads.

2. A sample of photoresist was taken as a control-BW2. The photoresist solution was then added to the Pack and the pump was started so to control the flow rate at 126 ml/min. and to keep it constant for the entire run. A second sample was taken immediately from the outlet, which sample was very light in color which signifies dillution-BW1. More samples were taken: after 20 minutes of recirculation and filtration-BW3; after 50 minutes of recirculation and filtration-BW4; and a final sample after 1 hour and 20 minutes of recirculation and filtration-BW5. All samples were submitted for metal ion analysis. Results are shown below in Table 2.

TABLE 2

| Metals (ppb) | BW2 (Control) | BW1 | BW3 | BW4 | BW5 |
|---|---|---|---|---|---|
| Na | 98 | 8 | 8 | 9 | 22 |
| K | 24 | 7 | 3 | 2 | 6 |
| Fe | 48 | 22 | 54 | 55 | 57 |
| Ca | 4 | 17 | 3 | <1 | 5 |

EXAMPLE 3

Performance Procedure

A 50 gram photoresist solution to be used as a reference was prepared according to the following formulation:

| | |
|---|---|
| NK-280 (a proprietary 2,1,5-diazonaphthoquinone sulfonyl chloride based sensitizer from Nippon Zeon Co.) | 2.02 gm |
| NK-240 (a proprietary 2,1,4-diazonaphthoquinone sulfonyl chloride based sensitizer from Nippon Zeon Co.) | 0.84 gm |
| Novolak Resin from Example 1 (as a solid) | 6.80 gm |
| Pyrogallol from Aldrich Co. | 0.1630 gm |
| BI26X-SA (a proprietary speed enhancer from Nippon Zeon Co.) | 1.203 gm |
| KP-341, a striation free surfactant from Shin-Etsu Chem. Co. (2% in Ethyl Lactate) | 0.004 gm |
| Ethyl Lactate | 33.147 gm |
| n-Butyl Acetate | 5.849 gm |

A sample of the treated photoresist solution from Example 2 (BW5) was compared to the reference.

The photoresist resist solutions were coated onto a hexamethyldisilazane (HMDS) primed silicon wafer to a 1.083 $\mu$m film thickness, and a soft bake at 90° C. for 60 seconds on an SVG® 8100 I-line hot plate was used. The exposure matrix was printed on the coated wafers using a 0.54 NA NIKON® i-line stepper and a NIKON® resolution reticle. The exposed wafers were PEB (post exposure baked) at 110° C. for 70 seconds on an in line hot plate. The wafers were then developed using AZ® 300 MIF TMAH (tetramethyl ammonium hydroxide—2.38%) developer. The developed wafers were examined using a HITACHI® S-400 SEM (scanning electron microscope). A nominal dose (Dose to Print, "DTP" or photospeed) was measured at the best focus, the dose required to precisely replicate a given feature. Resolution and depth of focus (DOF) were measured and are shown in Table 3 below.

TABLE 3

| Sample | Photospeed (millijoules/sec.) | Resolution ($\mu$m) | Depth of Focus (DOF) ($\mu$m) |
|---|---|---|---|
| Control | 160 | 0.32 | 0.8 |
| treated sample (BW5) | 165 | 0.32 | 0.8 |

EXAMPLE 4

Procedure

1. A CTG Klean® Pack, as shown in FIG. 1, containing a solid polypropylene tube and a 1½ inch long 10 $\mu$m polypropylene filter cartridge, was filled with 547 grams of a mixed bed of anion exchange resin and cation exchange resin beads from Barnstead® cartridge D8911-X001. The Pack was set up in a filtering system for constant recirculation.

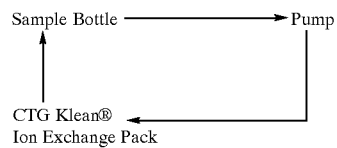

Prior to passing the novolak resin solution in ethyl lactate through the Pack, the ion exchange resin beads were flushed with acetone by recirculating acetone through the Pack at a flow rate of 126 ml/min. for 15 min. to substantially remove water from the beads.

2. A sample of 600 grams of fractionated MPT novolak resin in EL obtained by the procedure as described in example 1 was further diluted with 600 grams of acetone novolak resin solution in ethyl lactate and acetone (50/50) was then added to the Pack and the pump was started so to control the flow rate at 126 ml/min. and to keep it substantially constant for the entire run. A sample was taken before passing the novolak resin solution through the pack as a control (BW1). After one hour of recirculation and filtration-BW2 A, and after two hours of recirculation and filtration-BW3 A were taken. All samples were submitted for metal ion analysis. Results are shown below in Table 4.

TABLE 4

| Metals (ppb) | BW1 (Control) | BW2 A | BW3 A |
|---|---|---|---|
| Na | 122 | 10 | 10 |
| K | 13 | 5 | 4 |
| Fe | 194 | 11 | 4 |
| Cr | 41 | 7 | 3 |
| Ni | 52 | 5 | <1 |
| Ca | 2 | <1 | <1 |

EXAMPLE 5

Procedure

1. A CTG Klean® Ion Exchange Pack, as shown in FIG. 1, containing a solid polypropylene tube and a 1½ inch long 10 $\mu$m polypropylene filter cartridge, was filled with 301 g of Amberlyst® 15 Ion Exchange beads (cleaned with DI water, mineral acid and DI water and dried). The Pack was set up in a filtering system for constant recirculation.

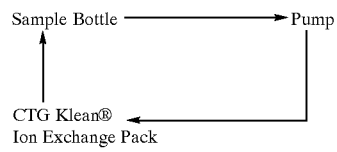

The Pack was filled with novolak resin solution obtained by the procedure as described in example 1 but was isolated in Methyl Amyl Ketone (fractionated MPT novolak resin in Methyl Amyl Ketone available from A Z Photoresists, Clariant Corp. as a 33% solids solution) and the pump was started so to control the flow rate at 50 ml/min. and to keep it constant for the entire run. One gallon of resin solution was circulated. A sample was taken before passing through the Pack as control #1. After 2 minutes a sample from the outlet (sample #2); after one hour of recirculation and filtration (sample #3); after two hours of recirculation and filtration (sample #4); after 3 hours of recirculation and filtration (sample #5A) were taken. All samples were analyzed for metal ions. Results are shown below in Table 5.

TABLE 5

| Metals (ppb) | (Control) | Sample #2 | Sample #3 | Sample #4 | Sample #5 |
|---|---|---|---|---|---|
| Na | 25 | 27 | 13 | 5 | 8 |
| Fe | 51 | 24 | 13 | 16 | 16 |
| Cr | 26 | 9 | 6 | 7 | 7 |

EXAMPLE 6

Procedure

Example 6 was repeated using the same Pack as example 5 and another gallon of novolak resin solution was processed, as in example 5. Results are shown below in Table 6.

TABLE 6

| Metals (ppb) | (Control) | Sample #3 | Sample #4 | Sample #5 |
|---|---|---|---|---|
| Na | 27 | 3 | 5 | 4 |
| Fe | 54 | 20 | 24 | 21 |
| Cr | 26 | 7 | 8 | 8 |

EXAMPLE 7

Procedure

Example 5 was repeated using the same Pack as example 5 and another gallon of novolak resin solution was processed, as in example 5. Results are shown below in Table 7.

TABLE 7

| Metals (ppb) | (Control) | Sample #3 | Sample #4 | Sample #5 |
|---|---|---|---|---|
| Na | 28 | 4 | 2 | 4 |
| Fe | 51 | 23 | 20 | 20 |
| Cr | 23 | 8 | 7 | 6 |

Unless otherwise specified, all parts and percentages are by weight and all molecular weights are weight average molecular weight.

Having described the invention, what I desire to claim is:

1. A method for producing a water insoluble, aqueous alkali soluble novolak having a very low level of metal ions comprising:
    a) providing an Ion Exchange Pack which Ion Exchange Pack comprises:
        1) a housing,
        2) one or more cylindrical bags positioned within such housing,
        3) a seal near the top of the housing that is effective to seal the Ion Exchange Pack;
        4) an inlet positioned so as to allow the introduction of a solution through the seal into the cylindrical bag(s) positioned within the housing,
        5) a support that extends from the bottom of the housing to the seal positioned near the top of the housing, and
        6) an outlet positioned so as to allow the exit of the solution from the Ion Exchange Pack through the seal;
    b)
        1) rinsing a cation exchange resin, e.g. in a column or in a batch process, with deionized water, followed by rinsing with a mineral acid solution, again rinsing with deionized water, and thereby reducing the level of sodium and iron ions in the ion exchange resin to less than 50 ppb each; or
        2) rinsing a chelating ion exchange resin deionized water, followed by rinsing with a mineral acid solution, again rinsing with deionized water, followed by rinsing with an ammonium hydroxide solution, and thereby converting the chelating ion exchange resin to its ammonium salt, followed by again rinsing with deionized water, and thereby reducing the level of sodium and iron ions in the chelating ion exchange resin to less than 50 ppb each; or
        3) rinsing an anion exchange resin with an ammonium hydroxide solution, followed by rinsing with deionized water, and thereby reducing the level of sodium and iron ions in the anion exchange resin to less than 50 ppb each; or
        4) rinsing a mixture of a cation exchange resin and an anion exchange resin with deionized water, followed by rinsing with a water soluble organic polar solvent, and thereby reducing the level of sodium and iron ions to less than 50 ppb each;
    c) transferring an ion exchange resin or mixture of ion exchange resins from step b) to the Ion Exchange Pack from step a);
    d) either before or after transferring the ion exchange resin(s) from step b) to the Ion Exchange Pack from step a), rinsing the ion exchange resin(s) from step b) with an electronic grade organic polar solvent, followed by rinsing with a photoresist solvent to substantially remove the polar solvent;
    e) passing a solution through the Ion Exchange Pack from step d), at a temperature of from about 30 to about 150° C. at a flow rate such that the residence time in the Ion Exchange Pack is from about 2 minutes to about 40 hours and thereby reducing the level of sodium and iron ions in the solution of the material treated to less than 50 ppb each.

2. The method of claim 1 wherein said ion exchange resin is rinsed to reduce the sodium and iron ion level to less than 35 ppb each.

3. A process for producing a positive photoresist composition having a very low level of metal ions, which process comprises:
    a) providing an Ion Exchange Pack which Ion Exchange Pack comprises:
        1) a housing,
        2) one or more cylindrical bags positioned within such housing,
        3) a seal near the top of the housing that is effective to seal the Ion Exchange Pack;
        4) an inlet positioned so as to allow the introduction of a solution through the seal into the cylindrical bag(s) positioned within the housing,
        5) a support that extends from the bottom of the housing to the seat positioned near the top of the housing, and
        6) an outlet positioned so as to allow the exit of the solution from the Ion Exchange Pack through the seal;
    b)
        1) rinsing a cation exchange resin, e.g. in a column or in a batch process, with deionized water, followed by rinsing with a mineral acid solution, again rinsing with deionized water, and thereby reducing the level of sodium and iron ions in the ion exchange resin to less than 50 ppb each; or 2) rinsing a chelating ion exchange resin deionized water, followed by rinsing with a mineral acid solution, again rinsing with deionized water, followed by rinsing with an ammonium hydroxide solution, and thereby converting the chelating ion exchange resin to its ammonium salt, followed by again rinsing with deionized water, and thereby reducing the level of sodium and iron ions in the chelating ion exchange resin to less than 50 ppb each; or 3) rinsing an anion exchange resin with an ammonium hydroxide solution, followed by rinsing with deionized water, and thereby reducing the level of sodium and iron ions in the anion exchange resin to less than 50 ppb each; or 4) rinsing a mixture of a cation exchange resin and an anion exchange resin with deionized water, followed by rinsing with a water soluble organic polar solvent, and thereby reducing the level of sodium and iron ions to less than 50 ppb each;

c) transferring an ion exchange resin or mixture of ion exchange resins from step b) to the Ion Exchange Pack from step a);

d) either before or after transferring the ion exchange resin(s) from step b) to the Ion Exchange Pack from step a), rinsing the ion exchange resin(s) from step b) with an electronic grade organic polar solvent, followed by rinsing with a photoresist solvent to substantially remove the polar solvent;

e) passing a solution through the Ion Exchange Pack from step d), at a temperature of from about 30 to about 150° C. at a flow rate such that the residence time in the Ion Exchange Pack is from about 2 minutes to about 40 hours and thereby reducing the level of sodium and iron ions in the solution of the material treated to less than 50 ppb each;

f) providing an admixture of:
1) a photosensitive component in an amount sufficient to photosensitive the photoresist composition;
2) the novolak resin solution from step e) and
3) a suitable photoresist solvent.

4. The method of claim 3 wherein said ion exchange resin is washed to reduce the sodium and iron level to less than 35 ppb each.

5. The method of claim 3 wherein said photoresist solvent is selected from the group consisting of propylene glycol methyl ether acetate, ethyl lactate and ethyl-3-ethoxypropionate.

6. The method of claim 3 wherein said ion exchange resin is washed to reduce the total sodium and iron level to less than 20 ppb each.

7. The method of claim 3 wherein the sodium and iron ion level of the novolak resin is reduced to less than 20 ppb each.

8. The method of claim 3 wherein said ion exchange resin is washed to reduce the total sodium and iron level to less than 20 ppb each.

9. The method of claim 3 wherein said novolak resin produced has a sodium and iron ion level of less than 10 ppb each.

10. The method of claim 3 wherein the novolak resin solvent and the solvent used for washing said ion exchange resin are identical.

11. The method of claim 3 wherein the novolak resin solvent, the solvent used for washing said ion exchange resin and the solvent for said photoresist composition are all identical.

* * * * *